US006563685B2

(12) United States Patent
Gotzig

(10) Patent No.: US 6,563,685 B2
(45) Date of Patent: May 13, 2003

(54) THERMAL PROTECTION RELAY

(75) Inventor: Bernhard Gotzig, Grenoble (FR)

(73) Assignee: Schneider Electric Industries SA (FR)

( * ) Notice: Subject to any disclaimer, the term of this patent is extended or adjusted under 35 U.S.C. 154(b) by 54 days.

(21) Appl. No.: 09/729,770

(22) Filed: Dec. 6, 2000

(65) Prior Publication Data

US 2001/0019299 A1 Sep. 6, 2001

(30) Foreign Application Priority Data

Dec. 6, 1999 (FR) ............................................. 99 15315

(51) Int. Cl.⁷ .......................... H01H 47/32; H02H 3/08; H02H 3/44
(52) U.S. Cl. ....................... 361/187; 361/160; 361/139; 361/93.2; 337/14; 337/6; 337/4
(58) Field of Search .................. 337/4–6, 141, 337/142, 143, 157, 158; 361/5, 62, 63, 78, 79, 87, 93.1–93.9, 102–104, 139, 160, 187, 115

(56) References Cited

U.S. PATENT DOCUMENTS

| 4,148,086 A | * | 4/1979 | Landa et al. ................ 340/588 |
| 4,571,659 A | * | 2/1986 | Demeyer et al. .............. 361/31 |
| 4,717,984 A | * | 1/1988 | Henry et al. .................... 307/66 |
| 5,214,559 A | * | 5/1993 | Zerbian et al. .............. 318/490 |
| 5,493,468 A | * | 2/1996 | Hunter et al. .................. 361/31 |
| 5,546,262 A | * | 8/1996 | Baurand et al. ............. 318/471 |
| 5,585,995 A | * | 12/1996 | Baurand et al. ............. 361/103 |
| 5,875,087 A | * | 2/1999 | Spencer et al. ................ 361/85 |
| 6,141,202 A | * | 10/2000 | Maeckel et al. ............. 337/143 |

FOREIGN PATENT DOCUMENTS

| EP | 0 866 485 A1 | 9/1998 | |
| EP | 0 869 597 A1 | 10/1998 | |
| FR | 2581265 A1 | * 10/1986 | ............ H02H/5/04 |
| WO | WO97/04511 | 2/1997 | |

* cited by examiner

*Primary Examiner*—Anatoly Vortman
(74) *Attorney, Agent, or Firm*—Parkhurst & Wendel, L.L.P.

(57) ABSTRACT

The thermal protection relay determines a value representative of the thermal image of an apparatus to be protected according to a measured current value, to a previous value of the thermal image and to preset heating and cooling time constants. The relay takes into account a non-zero initial thermal image, determined from experimental thermal resistance curves of the apparatus. In the case of a motor, for example, this enables the cold tripping curve of the relay to be lowered without modifying the hot tripping curve, so as to bring the tripping curves of the relay closer to the thermal resistance curves of the motor.

5 Claims, 8 Drawing Sheets

THERMAL PROTECTION RELAY

BACKGROUND OF THE INVENTION

The invention relates to a thermal protection relay designed to protect an electrical apparatus, comprising means for measuring a current absorbed by the apparatus, means for determining a value representative of the thermal image of the apparatus according to the value of the measured current, to a previous value of the thermal image and to at least one preset time constant, means for determining at least one protection threshold, means for comparing the value representative of the thermal image with the protection threshold and means for producing an alarm and/or tripping signal when the value representative of the thermal image exceeds the protection threshold.

Such a relay 1 can be used for protection of a motor 2 (FIG. 1), a transformer, an electrical line or a capacitor bank. As represented in FIG. 1, current sensors 3 supply the relay 1 with signals representative of the current absorbed by the motor 2. The relay 1 computes, from the measured currents, a value representative of the thermal image of the motor 2, i.e. representative of the heating of the motor. In the event of an excessively large heating due for example to an overload and exceeding respectively an alarm threshold $E_{sa}$ or a tripping threshold $E_{sd}$, the relay 1 supplies an alarm signal or a tripping signal. The tripping signal causes opening of contacts 4 and interruption of the power supply of the motor 2.

In conventional manner, a value $E_k$ of the thermal image is computed, at a time t, according to the equation:

$$E_k = E_{k-1} + \left(\frac{I_{eq}}{I_b}\right)^2 \cdot \frac{\Delta t}{\tau} - E_{k-1} \cdot \frac{\Delta t}{\tau} \quad (1)$$

in which:
- $E_{k-1}$ is the previous value of the thermal image, computed at the time $(t-\Delta t)$.
- $I_{eq}$ is an equivalent current, representative of the current absorbed by the motor and determined from the measured currents.
- $I_b$ is the base current of the apparatus, i.e. the current absorbed by the apparatus in operation under nominal operating conditions.
- $\tau$ is the time constant of the apparatus to be protected. Conventionally, the time constant $\tau$ can take two distinct values, a heating time constant $\tau_1$ when the motor is running, and a cooling time constant $\tau_2$, supplied by the manufacturer, when the motor is not running.

In known manner, the equivalent current $I_{eq}$ is computed from the measured currents according to the equation:

$$I_{eq}^2 = I^2 + K I_{inv}^2 \quad (2)$$

in which:
- I is the largest of the measured rms currents flowing in phase conductors supplying the apparatus
- $I_{inv}$ is the measured inverse current
- K is an adjustable coefficient.

As represented in FIG. 2, cold and hot time/current tripping curves of the relay, respectively $C_{f1}$ and $C_{c1}$ (in broken lines), can thus be defined.

The cold tripping curve $C_{f1}$ defines the tripping time of the protection relay from zero heating, according to the equation:

$$\frac{t}{\tau} = \log \frac{\left(\frac{I_{eq}}{I_b}\right)^2}{\left(\frac{I_{eq}}{I_b}\right)^2 - E_{sd}} \quad (3)$$

in which $E_{sd}$ is the tripping threshold.

The hot tripping curve $C_{c1}$ defines the tripping time of the protection relay from a nominal heating level E=1, according to the equation:

$$\frac{t}{\tau} = \log \left( \frac{\left(\frac{I_{eq}}{I_b}\right)^2 - 1}{\left(\frac{I_{eq}}{I_b}\right)^2 - E_{sd}} \right) \quad (4)$$

For a preset current greater than a maximum current in steady-state operating conditions, the tripping time from a cold state of the motor to be protected is greater than that obtained from a hot state of the motor.

As an example, in FIG. 2, for a current $I_{eq}/I_b=2$, the tripping time of the relay is 665 s when cold (point $A_1$) and 70 s when hot (point $A_2$).

Manufacturers generally provide experimental hot and cold thermal resistance curves of the apparatus. In FIG. 2, the curves of the motor when hot $C_{c1m}$ and cold $C_{f1m}$ (in unbroken lines) are shifted upwards with respect to the associated curves $C_{c1}$ and $C_{f1}$ of the relay. Protection of the corresponding motor is therefore performed correctly by the relay.

It does however happen that the hot and cold thermal resistance curves of the motor ($C_{c2m}$ and $C_{f2m}$) are much closer than those of the relay ($C_{c2}$ and $C_{f2}$), as represented in FIG. 3. In the example represented in FIG. 3, for a current $I_{eq}/I_b=2$, the hot thermal resistance time of the relay is 250 s (point $A_3$), as previously lower than the corresponding thermal resistance time of the motor. However, the cold tripping time of the relay is 620 s (point $A_4$), greater than the cold thermal resistance time (point $A_5$) of the motor. The motor is therefore not protected correctly when it is subjected to an overload from a cold state, although tripping from a hot state remains assured within the necessary time.

By lowering the heating time constant $\tau_1$ of the relay, the two tripping curves of the relay can be shifted downwards. The new hot tripping curve $C_{c3}$ and cold tripping curve $C_{f3}$ thus obtained are both situated below the associated curves of the motor ($C_{c2m}$ and $C_{f2m}$). The new cold thermal resistance time (point $A_6$) is then lower than the cold thermal resistance time of the motor (point $A_5$). The same is true for the hot thermal resistance time (points $A_7$ and $A_3$).

However, lowering the hot tripping curve of the relay can give rise to problems on start-up. The hot tripping curve $C_{c3}$ of the relay can in fact cross the motor start-up curve, as represented in FIG. 3. In FIG. 3, two start-up curves $C_{d1}$ and $C_{d2}$ are represented. Each of these curves represents the current value versus time, on start-up of the motor, respectively for a start-up with rated voltage $U_n$ ($C_{d1}$) and for a start-up with a voltage of 0.9 $U_n$ ($C_{d2}$).

The hot tripping curve $C_{c3}$ crosses the start-up curve $C_{d1}$ at the point $A_8$ and the start-up curve $C_{d2}$ at the point $A_9$. Thus, in case of a hot start-up, the current value is such that it immediately causes tripping, thus preventing any hot start-up.

OBJECT OF THE INVENTION

The object of the invention is to overcome these drawbacks and to provide a good thermal protection of the apparatus in all circumstances.

According to the invention, this object is achieved by the fact that a non-zero initial thermal image is taken into account for determining the thermal image, the value of the initial thermal image being determined from experimental thermal resistance curves of the apparatus.

According to a development of the invention, the protection threshold being a tripping threshold, the cold tripping time t of the relay is given by the equation:

$$\frac{t}{\tau} = \log\left[\frac{\left(\frac{I_{eq}}{I_b}\right)^2 - E_{s0}}{\left(\frac{I_{eq}}{I_b}\right)^2 - E_{sd}}\right] \quad (5)$$

in which:

$\tau$ is the time constant of the relay $I_b$ is the base current of the apparatus $I_{eq}$ is an equivalent current representative of the measured current $E_{s0}$ is the initial thermal image $E_{sd}$ is the tripping threshold.

The initial thermal image $E_{s0}$ is preferably determined according to the equation:

$$E_{s0} = \left(\frac{I_r}{I_b}\right)^2 - e^{\frac{t_r}{\tau_1}} \cdot \left[\left(\frac{I_r}{I_b}\right)^2 - E_{sd}\right] \quad (6)$$

in which:

Ib is the base current of the apparatus

Ir is a preset setting current tr is a required cold tripping time associated to the setting current Ir $\tau_1$ is a heating time constant, determined from an experimental hot thermal resistance curve of the apparatus.

The relay can, in addition, comprise means for measuring the ambient temperature and means for correcting the value representative of the thermal image according to the ambient temperature measured.

According to another development of the invention, in the case of a motor, the time constants, alarm and/or tripping threshold and initial thermal image constituting a set of parameters of the relay, the relay comprises means for comparing the measured current and a current threshold representative of a blocked state of the motor rotor, and means for selecting a first set of parameters when the measured current is lower than the current threshold and for selecting a second set of parameters when the measured current is higher than the current threshold.

BRIEF DESCRIPTION OF THE DRAWINGS

Other advantages and features will become more clearly apparent from the following description of particular embodiments of the invention, given as non-restrictive examples only and represented in the accompanying drawings in which.

DETAILED DESCRIPTION OF THE PREFERRED EMBODIMENTS

Figure 1:
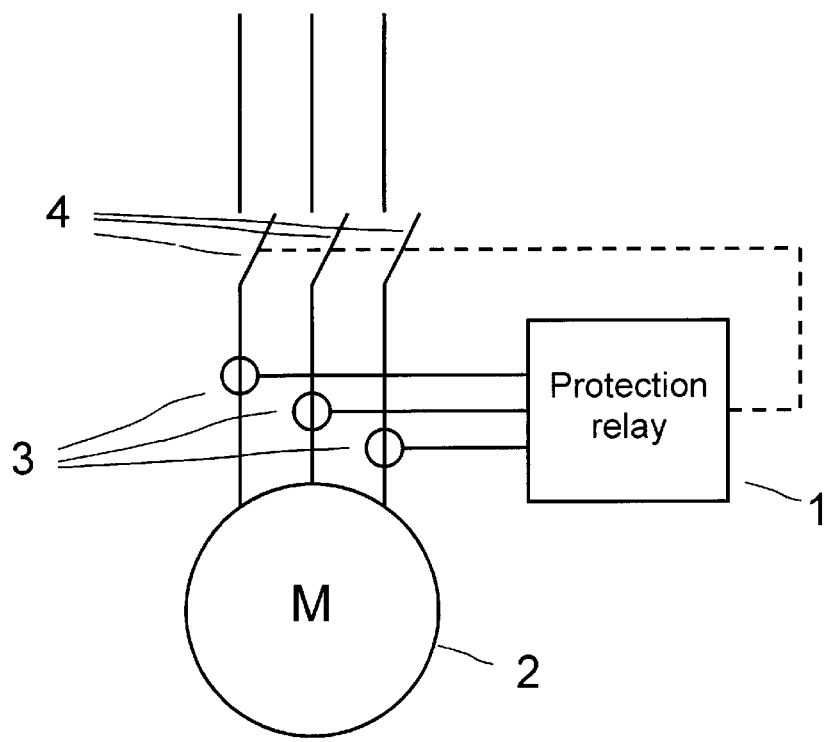
FIG. 1 represents, in very schematic manner, a thermal protection relay of a motor according to the prior art, in which the invention can be implemented.
Figure 2:
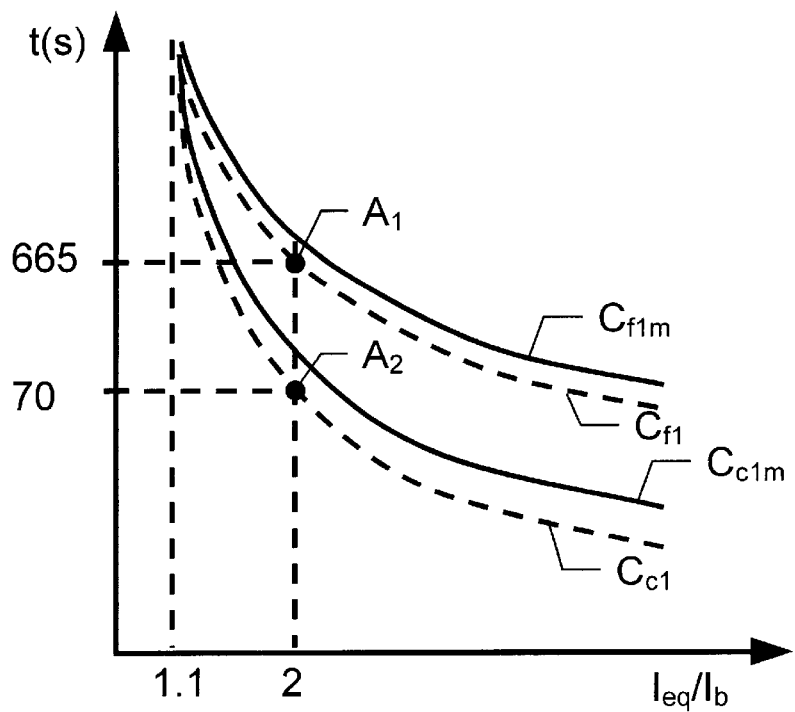
FIGS. 2 and 3 represent the time/current thermal resistance curves of a motor according to the prior art, FIG. 3 representing in addition the start-up curves of the motor.
Figure 9:
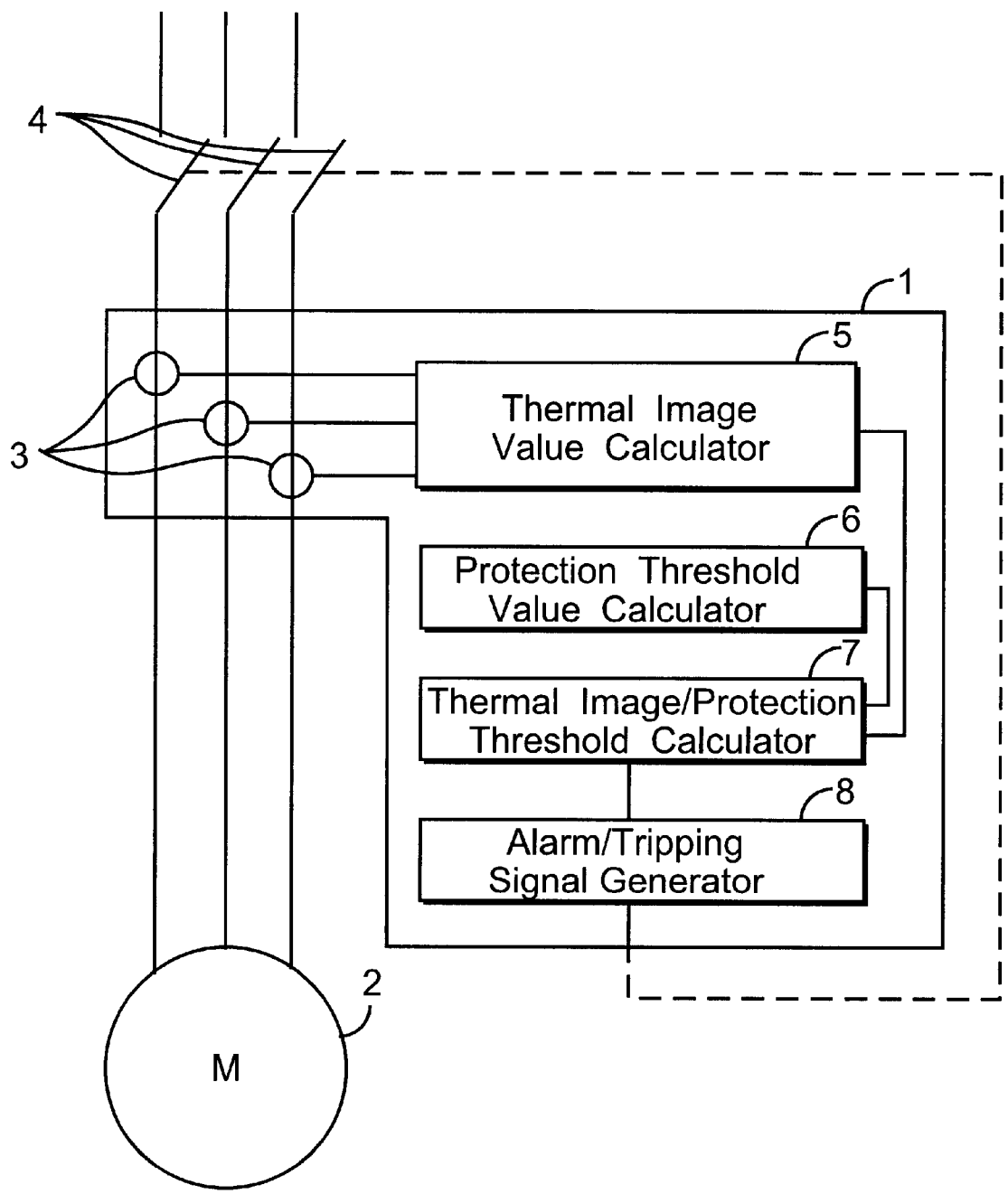
FIG. 9 is a highly schematic drawing of an implementation of a thermal protection relay 1, according to the presently claimed invention.

FIG. 9 is a highly schematic drawing of an implementation of a thermal protection relay 1, according to the presently claimed invention, wherein components in common with the prior art relay implementation shown in FIG. 1 are designated by common reference numerals.

Relay 1 can be used with any appropriate device, such as a transformer, an electrical line, a capacitor bank, or a motor 2, as shown in FIG. 9. As represented in FIG. 9, current sensors 3 are for supplying the relay 1 with signals representative of the current absorbed by the motor 2. The thermal value calculator 5 of relay 1 is for computing, from the measured currents, from a previous value of the thermal image, and at least one preset time constant, a value representative of the thermal image of the motor 2, i.e., representative of the heating of the motor. The protection threshold calculator 6 of relay 1 is for computing at least one protection threshold. The thermal image/protection threshold comparator 7 of relay 1 is for comparing a value representative of the thermal image with the protection threshold. The alarm/tripping signal generator 8 of relay 1 is for initiating a signal when the value representative of the thermal image exceeds the protection threshold. The tripping signal is for causing contacts 4 to open and interruption of the power supply to the motor 2.

Figure 10:
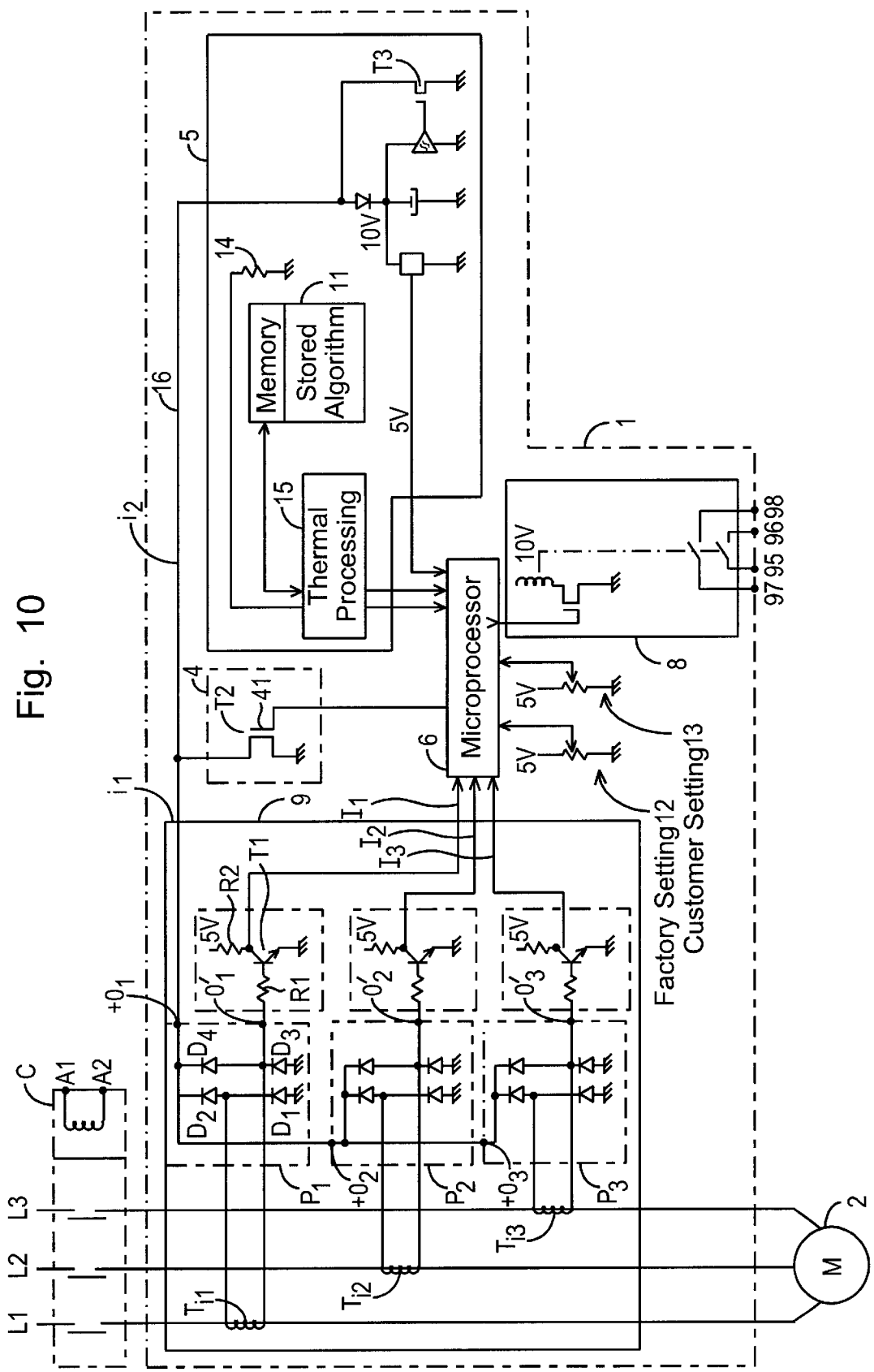
FIG. 10 is an electrical schematic drawing showing interconnections of the relay shown in FIG. 9.

FIG. 10 is an example schematic showing typical electrical connections of the presently claimed invention, wherein same or like elements as shown in FIG. 9 are given same numerals. Motor 2 is connected to thermal protection relay 1, which includes means 9 for measuring a current, to means 9 for determining a value representative of a thermal image, means 6 for determining at least a protection threshold and means for comparing a thermal image/protection threshold, and means 8 for producing an alarm and/or tripping signal. Current measuring means 9, thermal imaging value calculating means 5 including thermal processing calculator 15, protection threshold determining means 6, and alarm means 8, are all connected to microprocessor 6. Memory 11, also connected to microprocessor 6, is used to store the at least one time preset constant, the non-zero initial value, and the previous value representative of a thermal image. Also shown are factory setting component 12 and customer setting component 13 connected to microprocessor 6.

Figure 3:
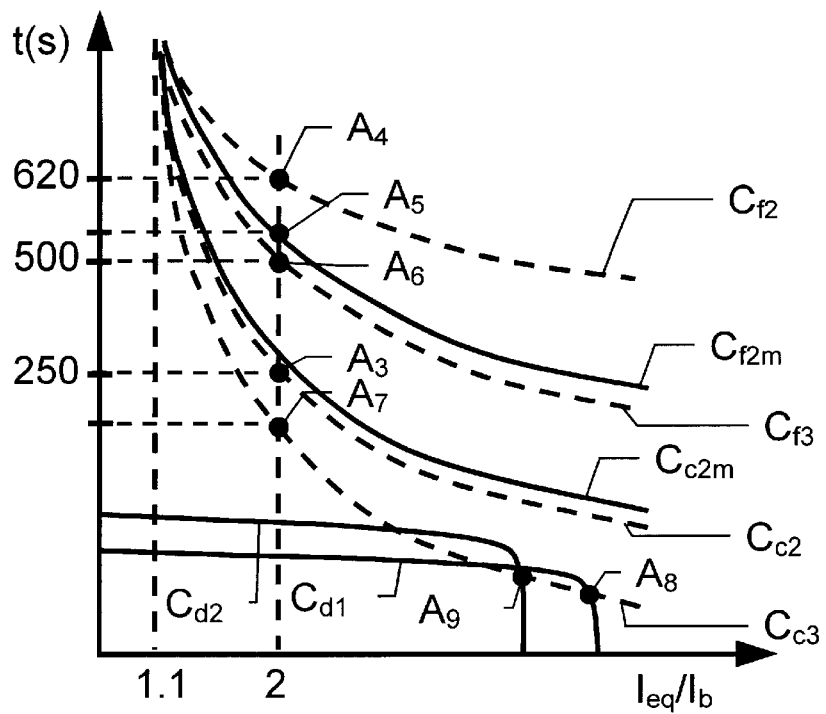
Figure 4:
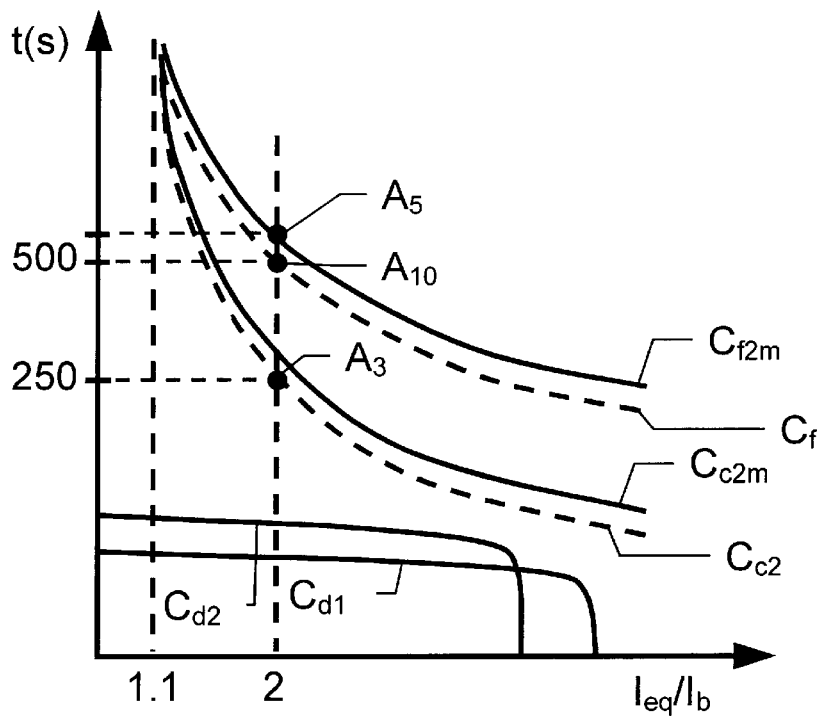
FIG. 4 represents the start-up curves of a motor and the thermal resistance curves of the motor and of a relay according to the invention.

In the embodiment of the invention represented in FIG. 4, the thermal resistance curves $C_{f2m}$ and $C_{c2m}$ of the motor, and the start-up curves $C_{d1}$ and $C_{d2}$ of the motor are identical to those of FIG. 3. The hot tripping curve of the relay $C_{c2}$, which does not cut the motor start-up curves $C_{d1}$ and $C_{d2}$, also remains unchanged. The cold tripping curve of the relay $C_f$ is on the other hand modified, so as to drop below the cold thermal resistance curve $C_{f2m}$ of the motor. As an example, for $I_{eq}/I_b=2$, the point $A_3$ is unchanged and the point $A_{10}$ of the cold curve $C_f$ of the relay is below the point $A_5$ of the cold curve $C_{f2m}$ of the motor.

This result is obtained taking account of a non-zero initial thermal image $E_{s0}$ when computing the value E representative of the thermal image.

Equation (3) giving the cold tripping time of the relay is modified and replaced by equation (5). If $E_{s0}=0$, we get the conventional cold tripping curve equation (3). If on the other hand $E_{s0}=1$, we get the conventional hot tripping curve equation (4).

The value of the initial thermal image $E_{s0}$ is determined from experimental thermal resistance curves of the apparatus. This value is comprised between 0 and 1.

As an example, based on the curves of FIGS. 3 and 4, the value of the initial thermal image $E_{s0}$ can be determined in the following manner. The motor cooling time constant $\tau_2$ being known, we also have available hot experimental curves $C_{c2m}$ and cold experimental curves $C_{f2m}$ of the motor and of the maximum current $I_{max}$ under steady-state operating conditions. As an example, if $I_{max}/I_b=1.1$ the tripping threshold $E_{sd}$ is adjusted accordingly so that $E_{sd}=(I_{max}/I_b)^2$ i.e. $E_{sd}=1.2$. An alarm threshold $E_{sa}$ can be set at 0.9 for example. To determine the heating time constant $\tau_1$ of the relay, equation (4) corresponding to the hot curve $C_{c2}$ of the relay can be used, in which the equivalent current $I_{eq}$ is replaced by a preset adjustment current $I_r$. A value $t_c/\tau_1$ is thus obtained in which $t_c$ is the required hot tripping time associated to the adjustment current $I_r$. In practice, tables containing the numerical values of the hot curve of the relay are preferably used. For example purposes, for $E_{sd}=1.2$ and $I_r/I_b=2$, $t_c/\tau_1=0.069$ is obtained In the embodiment of FIG. 4, for tripping to take place at the point $A_3$ for which $I_r/I_b=2$ and $t_c=250$ s, compatible with the hot thermal resistance of the motor (curve $C_{c2m}$), the time constant $\tau_1$ can then be set to 29 minutes, corresponding to the curve $C_{c2}$ of FIG. 4.

Using equation (3) with $\tau=\tau_1=29$ minutes, $I_{eq}/I_b=I_r/I_b=2$ and $E_{sd}=1.2$, or tables corresponding to the cold curve $C_{f2}$ of the relay, the corresponding cold tripping time $t_f$ is obtained: $t_f/\tau_1=0.3567$, i.e. for $\tau_1=29$ min, $t_f=620$ s, corresponding to the point $A_4$ of the curve $C_{f2}$ of FIG. 3. In this particular case, the point $A_4$ is situated above the point $A_5$ corresponding to the experimental cold curve $C_{f2m}$ of the motor, which does not enable correct protection of the motor to be achieved.

For this, the cold curve of the relay is modified introducing an initial thermal image $E_{s0}$ such that the required cold tripping time $t_r$ associated to the adjustment current $I_r$ is lower than the tripping time associated to the point $A_5$ of the cold curve $C_{f2m}$ of the motor. As an example $t_r=500$ s, corresponding to a point $A_{10}$ situated above the point $A_5$ for $I_r/I_b=2$ (FIG. 4).

Computation of $E_{s0}$ is performed from equation (6), which is deduced from equation (5) in which $t=t_r$, $\tau=\tau_1$ and $I_{eq}=I_r$. In the above-mentioned example, with $t_r=500$ s, $I_r/I_b=2$, $\tau_1=29$ minutes and $E_{sd}=1.2$, $E_{s0}=0.27$ is obtained. The cold curve $C_{f2}$ of the relay (FIG. 3) is thus shifted downwards to give the cold curve $C_f$ (FIG. 4) compatible with the thermal resistance of the motor, whereas the hot curve $C_{c2}$ of the relay, itself compatible with the thermal resistance of the motor, is not modified.

Figure 5:
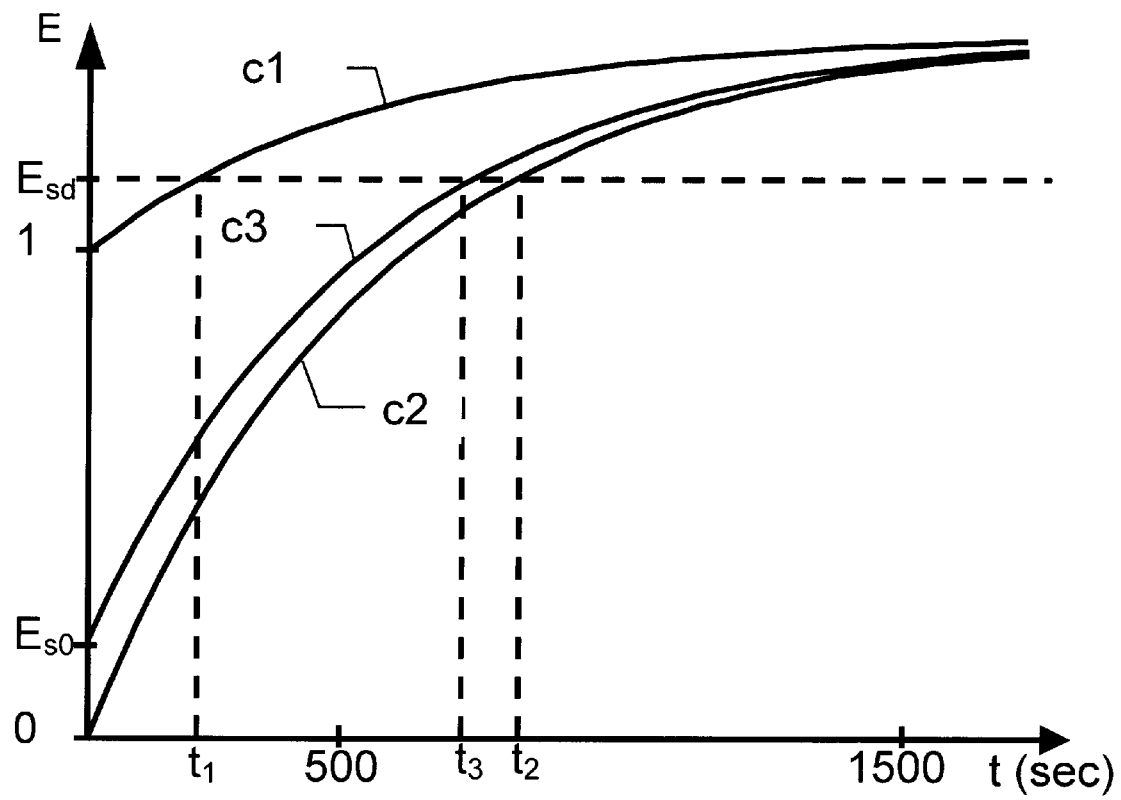
FIG. 5 represents the variations versus time of the thermal image E in the event of an overload, respectively according to the prior art and according to the invention.

In FIG. 5 the variations of the thermal image E versus time are represented, according to equation (1) in the event of an overload of the apparatus, the motor 2 for example. It should be noted that in case of normal operation of the apparatus, with no overload, the thermal image is limited to its nominal value 1. In a relay according to the prior art, the variations of the thermal image are represented by the curves c1, starting from 1 if start-up of the apparatus is performed hot, and c2 starting from 0 if start-up of the apparatus is performed cold. The corresponding tripping times, respectively hot and cold, are indicated at $t_1$ and $t_2$. Introduction of the initial thermal image $E_{s0}$ modifies the curve obtained from a cold state, which becomes the curve c3. The cold tripping time then becomes the time $t_3$, lower than the time $t_2$, whereas the hot tripping time $t_1$ is not modified.

Figure 6:
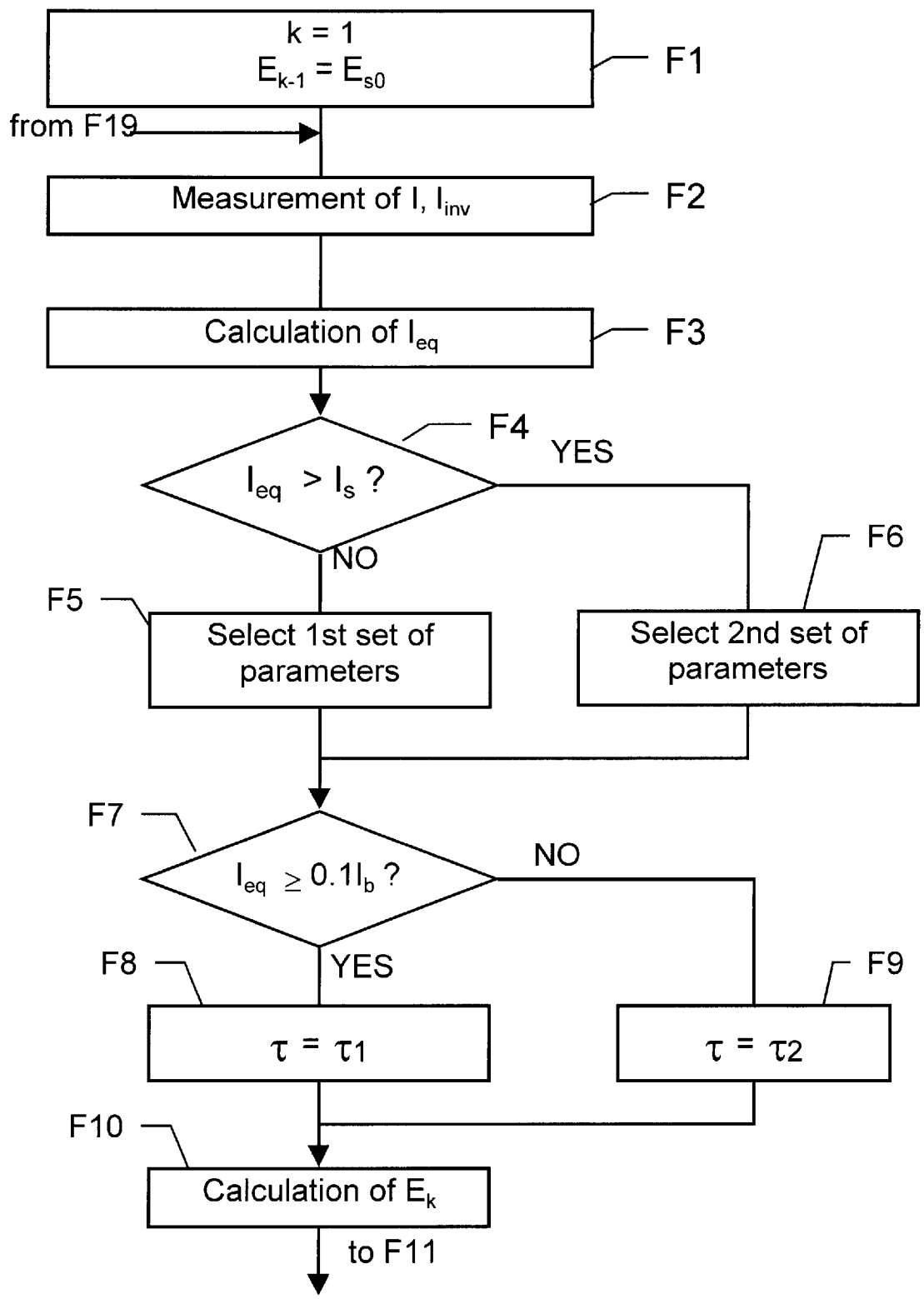
FIGS. 6 and 7 represent a particular embodiment of a flowchart able to be implemented in a relay according to the invention.
Figure 7:
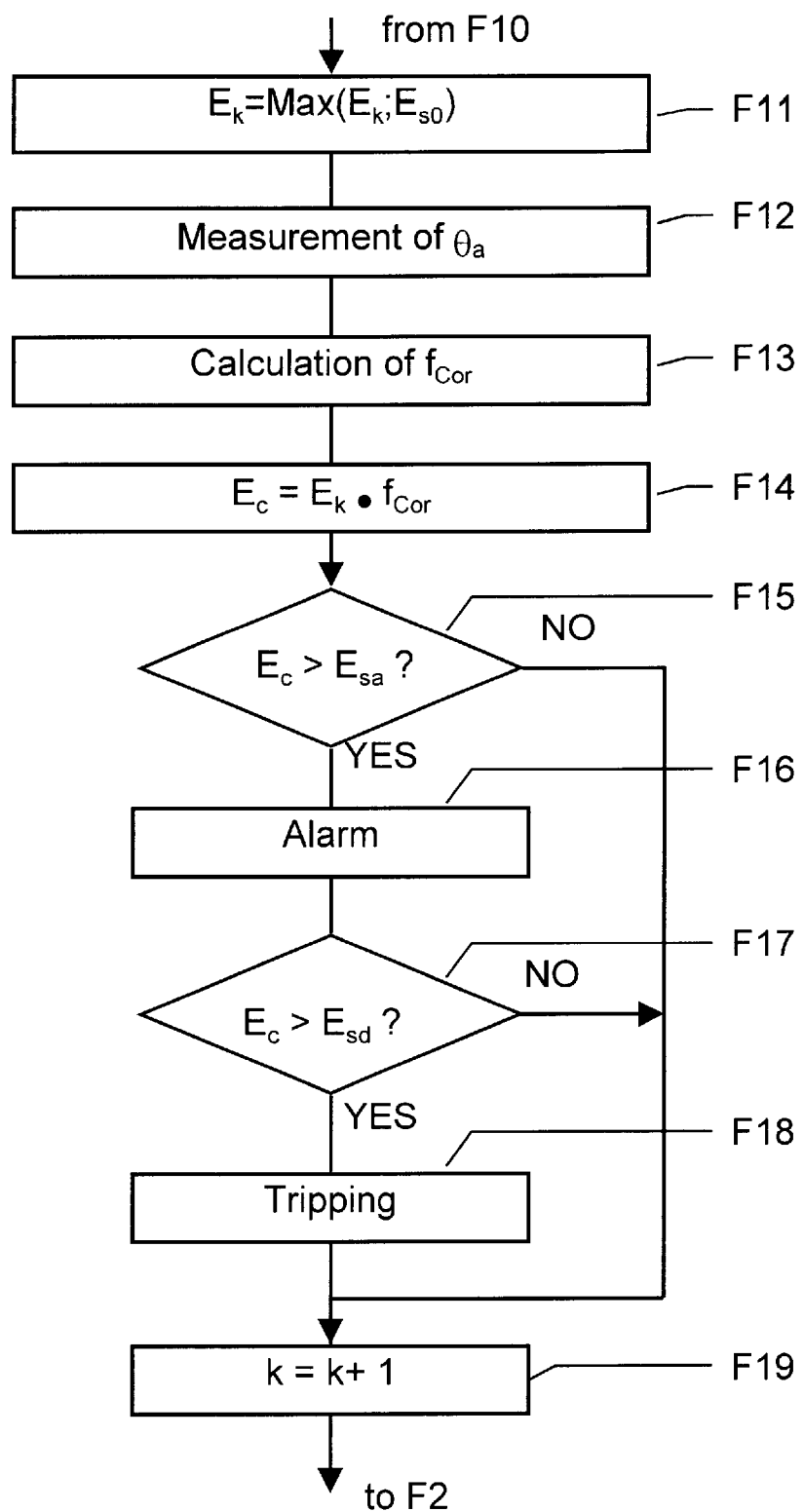

The protection relay 1 is preferably a microprocessor-based relay in which the invention can be implemented by means of a flow chart as described below with reference to FIGS. 6 and 7.

In a first initialization step F1, the coefficient k is set to 1 and the previous value of the thermal image $E_{k-1}$ takes the value $E_{s0}$, the value $E_{s0}$ having been previously determined as indicated above from the experimental tripping curves of the apparatus. Then, in a step F2, the currents I and $I_{inv}$ are measured. The equivalent current $I_{eq}$ is then computed (step F3) according to the equation (2). In the case of a motor, the equivalent current is then compared with a current threshold $I_s$ representative of a blocked state of the motor rotor. If the equivalent current $I_{eq}$ is not greater than $I_s$ (NO output of F4), the relay selects (step F5) a first set of parameters $\tau_1$, $\tau_2$, alarm threshold $E_{sa}$ and tripping threshold $E_{sd}$, and initial thermal image $E_{s0}$, determined as indicated above to take account of the cold $C_{f2m}$ and hot $C_{c2m}$ thermal resistance curves of the motor. If the equivalent current $I_{eq}$ is greater than $I_s$ (YES output of F4), the motor rotor is considered by the relay as being blocked and the relay selects a second set of parameters (step F6).

Figure 8:
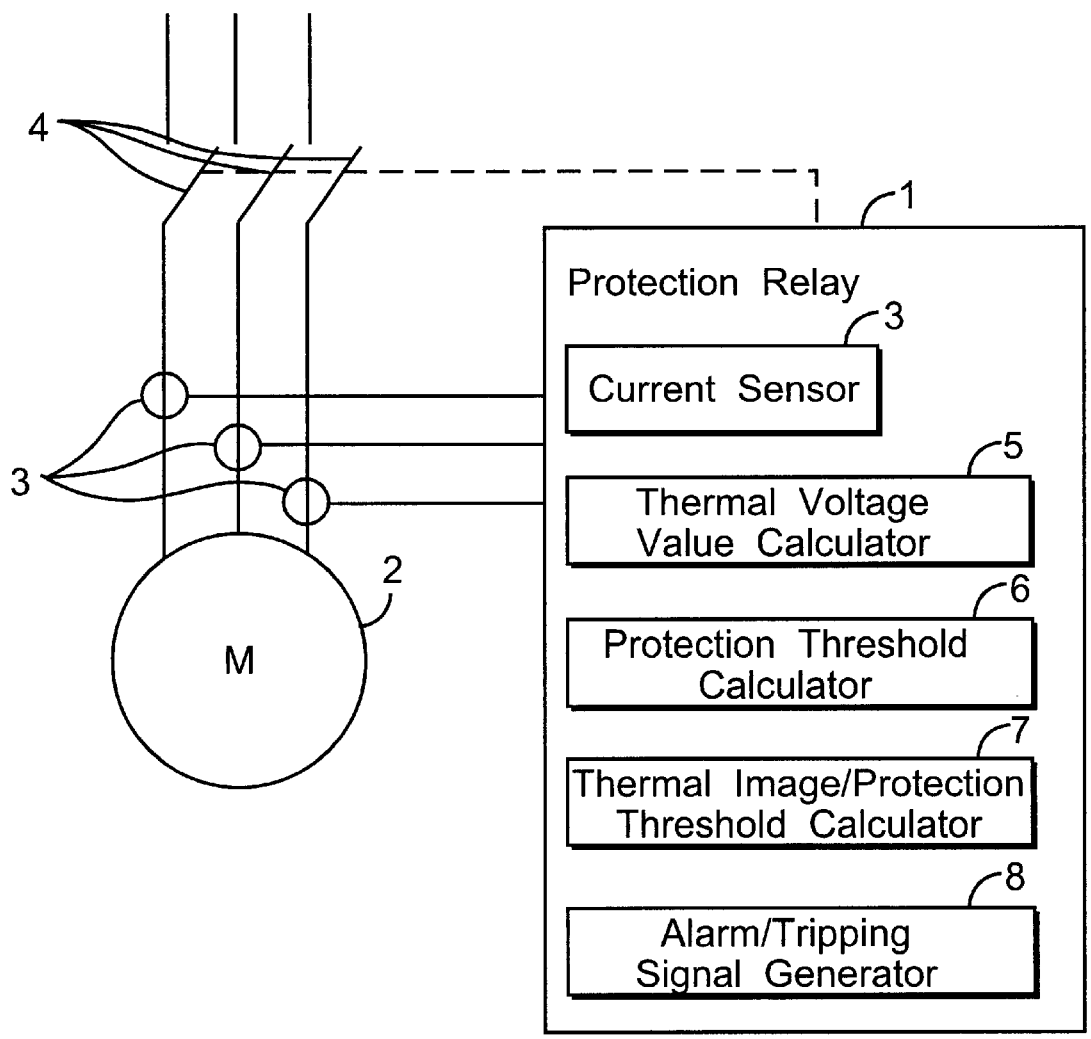
FIG. 8 represents the thermal resistance curves of a motor, in normal operation and with a blocked rotor, as well as the start-up curves of the motor.

When the rotor of a motor is blocked, its thermal behavior is in fact very different from its behavior under rated load. In these conditions, the motor can be damaged by overheating either of the rotor or of the stator. For high power motors, it is often the rotor which constitutes the limiting factor. The parameters selected for normal operation of the motor (first set of parameters) are no longer valid. The manufacturer may sometimes provide cold $C_{f3m}$ and hot $C_{c3m}$ curves (FIG. 8) of the motor when the rotor is blocked. Each curve is formed for different motor start-up voltages, respectively $U_n$, 0.8 $U_n$ and 0.65 $U_n$ in FIG. 8. The corresponding variation of the current on start-up is represented in FIG. 8 by the start-up curves $C_{d1}$ at $U_n$, $C_{d3}$ at 0.8 $U_n$ and $C_{d4}$ at 0.65 $U_n$. A second set of parameters can be determined, in the same way as the first set, taking account of the curves $C_{c3m}$ and $C_{f3m}$. Second values of the different parameters ($\tau_1$, $\tau_2$, $E_{sa}$, $E_{sd}$ and $E_{s0}$) are thus obtained which are taken into account at step F6 in the flowchart of FIG. 6. The value of the threshold current $I_s$ is preferably equal to 80% of the start-up current.

After the steps F5 or F6, the relay goes on to a step F7 in which the equivalent current $I_{eq}$ is compared to another, very low, current threshold, for example 0.1 $I_b$. If the equivalent current is greater than or equal to this other current threshold (YES output of F7), the motor is considered as being running and, in a step F8, the previously selected heating time constant $\tau_1$ is assigned to the time constant $\tau$. If on the other hand the equivalent current $I_{eq}$ is lower than this other current threshold (NO output of F7), this current is considered to be nil and the motor is considered as not being running. The cooling time constant $\tau_2$ is then used (step F9) as the time constant $\tau$. A new value $E_k$ of the thermal image is then computed, in a step F10, according to the equation (1). Then, in a step F11 (FIG. 7), the value of $E_k$ is replaced by the higher of the values $E_k$ and $E_{s0}$. Thus the value $E_k$ can never be lower than the initial thermal image $E_{s0}$, even after a long shut-down period of the motor.

In a preferred embodiment, a correction of the thermal image is then performed according to the ambient temperature (steps F12 to F14). For this, the relay comprises a temperature measurement sensor, supplying (step F12) a value $\theta_a$ representative of the ambient temperature. The maximum temperature $\theta_{max}$ of the conductors of the apparatus to be protected being known, a correction factor $f_{cor}$ is computed (step F13) such that:

$$f_{cor} = \frac{\theta_{max} - 40°\ C.}{\theta_{max} - \theta_n} \quad \text{and} \quad f_{cor} \geq 1 \tag{7}$$

The correction factor is then applied to the value of the thermal image $E_k$ to supply (step F14) a corrected thermal image $E_c$ such that: $E_c = E_k \cdot f_{cor}$. The steps F12 to F14 thus correspond to correction of the value of the thermal image according to the ambient temperature. As an example, the maximum temperature $\theta_{max}$ may be 160° C. If the ambient temperature $\theta_a$ is 50° C., the correction factor $f_{cor}=120/110$, greater than 1. Thus the correction factor increases the value of the thermal image when the ambient temperature exceeds a preset temperature limit, 40° C. in the example described, without modifying it so long as the ambient temperature remains lower than this temperature limit.

The value of the corrected thermal image $E_c$ is then compared with the alarm threshold $E_{sa}$ (step F15). If $E_c$ is greater than the alarm threshold $E_{sa}$ (YES output of step F15), an alarm is triggered (step F16), then $E_c$ is compared with the tripping threshold $E_{sd}$ (step F17). If the tripping threshold is exceeded (YES output of F17), a tripping signal is produced, causing the power supply to the apparatus to be interrupted. When the alarm or tripping thresholds are not exceeded (NO output of F15 or of F17), and also after the tripping step F18, the relay goes on to a step F19 in which the coefficient k is incremented (k=k+1) before going back to step F2 for computation of a new value of the thermal image taking account of the previously computed value $E_{k-1}$ which is stored in memory.

What is claimed is:

1. A thermal protection relay designed to protect an electrical apparatus, comprising means for measuring a current absorbed by the apparatus, means for determining a value representative of the thermal image of the apparatus according to the value of the measured current, to a previous value of the thermal image, said previous value being at least a non-zero initial value representative of the thermal image of the apparatus, and to at least one preset time constant, means for determining at least one protection threshold, means for comparing the value representative of the thermal image with the protection threshold and means for producing an alarm and/or tripping signal when the value representative of the thermal image exceeds the protection threshold, wherein the value of the initial thermal image is determined from experimental thermal resistance curves of the apparatus.

2. The relay according to claim 1, wherein the protection threshold being a tripping threshold, the cold tripping time t of the relay is given by the equation:

$$\frac{t}{\tau} = \log \left( \frac{\left(\frac{I_{eq}}{I_b}\right)^2 - E_{s0}}{\left(\frac{I_{eq}}{I_b}\right)^2 - E_{sd}} \right)$$

in which:

$\tau$ is the time constant of the relay $I_b$ is the base current of the apparatus $I_{eq}$ is an equivalent current representative of the measured current $E_{s0}$ is the initial thermal image $E_{sd}$ is the tripping threshold.

3. The relay according to claim 2, wherein the initial thermal image Es0 is determined according to the equation:

$$E_{s0} = \left(\frac{I_r}{I_b}\right)^2 - e^{\frac{t_r}{\tau_1}} \cdot \left[\left(\frac{I_r}{I_b}\right)^2 - E_{sd}\right]$$

in which:

Ib is the base current of the apparatus

Ir is a preset setting current tr is a required cold tripping time associated to the setting current Ir $\tau_1$ is a heating time constant, determined from an experimental hot thermal resistance curve of the apparatus.

4. The relay according to claim 1, further comprising means for measuring the ambient temperature and means for correcting the value representative of the thermal image according to the measured ambient temperature.

5. The relay according to claim 1, wherein, the apparatus being constituted by a motor and the time constants, alarm threshold and/or tripping threshold and initial thermal image constituting a set of parameters of the relay, the relay comprises means for comparing the measured current and a current threshold representative of a blocked state of the motor rotor and means for selecting a first set of parameters when the measured current is lower than the current threshold and for selecting a second set of parameters when the measured current is higher than the current threshold.

* * * * *